April 9, 1929.  E. GUÉRIN  1,707,980
FILM CAMERA
Filed April 14, 1925  2 Sheets-Sheet 1
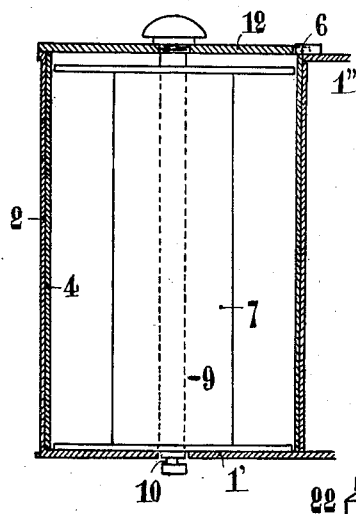
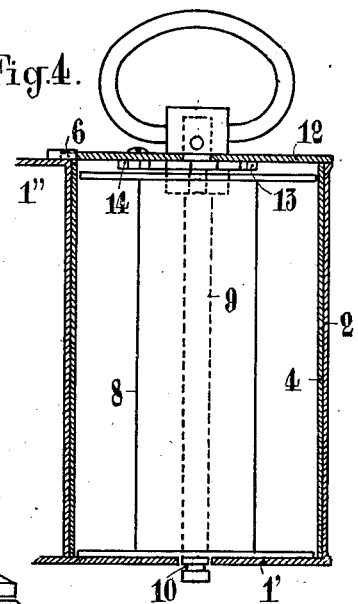
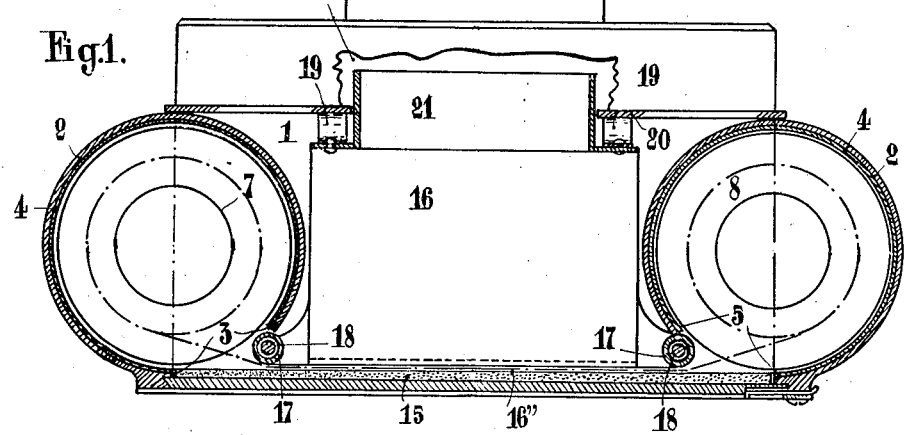
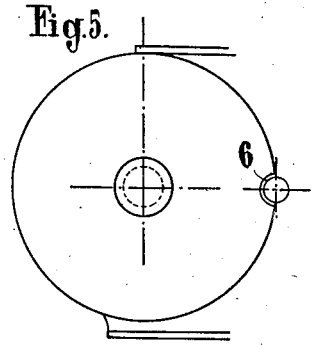
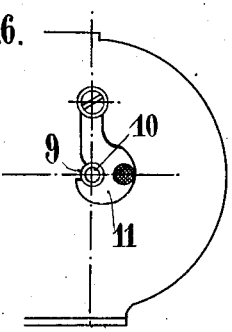
INVENTOR
Emile Guérin.
BY
ATTORNEY April 9, 1929.  E. GUÉRIN  1,707,980
FILM CAMERA
Filed April 14, 1925  2 Sheets-Sheet 2
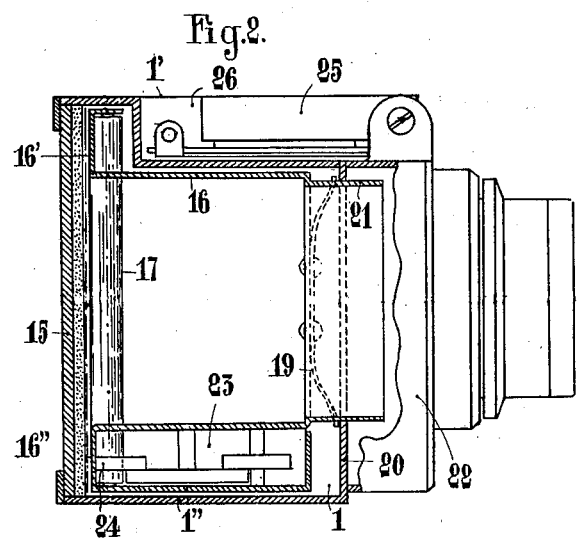
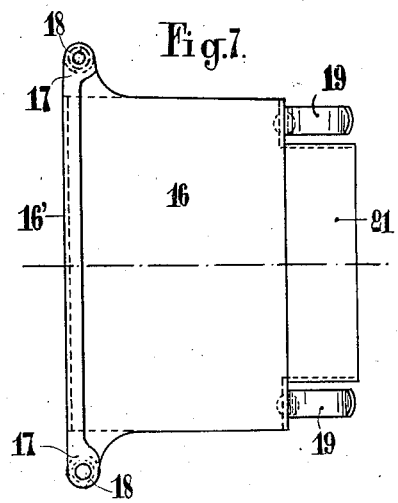
INVENTOR
Emile Guérin.
BY
ATTORNEY Patented Apr. 9, 1929.

1,707,980

UNITED STATES PATENT OFFICE.

EMILE GUÉRIN, OF PARIS, FRANCE.

FILM CAMERA.

Application filed April 14, 1925, Serial No. 22,991, and in France April 23, 1924.

My invention relates to photographic cameras for loading which are used promiscuously either reels of sensitized strip or reels of ordinary kinema film, or only reels of sensitized strip exclusive of film or again film exclusive of sensitized strip according to the arrangement of the apparatus.

My invention provides various improvements concerning

1. The manner of housing the reel of film in the apparatus and of effectuating its drive.

2. A device purposed to obtain and regulate the pressure to be applied against the film to ensure its being kept flat.

A further object of my invention is to provide a special embodiment of the photographic camera in the case where it is more particularly intended for using ordinary kinema film, such embodiments permitting the encumbrance of the whole to be reduced by taking advantage of the empty spaces, especially for the housing of the counter and of the view-finder.

In order to make my invention more clearly understood I have illustrated in and by a drawing appended hereto a camera fitted with my improvements and wherewith the use of kinema film permits encumbrance to be reduced.

In the said drawing:

Figure 1 is on an enlarged scale a plan view with horizontal section of the whole apparatus.

Figure 2 is a cross section along the medial plane thereof.

Figure 3 is a vertical part section showing details of the feed reel housing.

Figure 4 is a vertical section showing the details of the take up reel housing.

Figure 5 is a plan view illustrating the device serving as a registering mark for the mobile reel-housing tube.

Figure 6 is a plan part view as seen from the other face of the camera, showing details of the said mobile tube bolting.

Figure 7 is a plan view of the pressure regulator.

In all the figures the same reference numerals denote the same parts.

At each end of the body 1 of the camera, between the top wall 1' and the bottom wall 1" and parallel to the front is a cylindrical tube 2. Said tube is provided with a longitudinal slot 3 and has one of its ends closed by a wall of the camera. Its other end, which is open, receives frictionally a concentric tube 4 also provided with a slot 5 corresponding to the slot 3 and which a notch and projection 6 permits to make register therewith.

The mobile inner tube 4 is intended to receive one of the reels, either the feed one 7, or the take up one 8; its arrangement being adapted for this purpose. On the contrary the two outer tubes 2 are identical.

Mobile tubes 4 have one of their ends open, the one which engages into the corresponding fixed tube 2. Furthermore they are provided with an axle or spindle 9 the purpose of which is to afford a bolting means. For this purpose the said axle or spindle is longer than the tube so as to protrude out of wall 1' of the camera when the tube is positioned, and the said axle or spindle has a recess 10 which comes just outside the box permitting the bolt 11 shown by Figure 6 or any other means suitable to ensure a safety fastening to engage thereinto. At its other end mobile tube 4 is closed by a round piece 12. The one of the mobile tubes 4 intended to receive the take up reel 8 (Figure 4) is furthermore provided, inside it and contacting the said piece, with a ratchet 13 and pawl 14 much flattened so as to cause no bulging of the drive mechanism.

The advantages of the foregoing device, quite substantial with small size cameras, are (a) To afford means conveniently to handle the reels either for positioning or for removal;

(b) Unfailingly to prevent untimely unreeling of the film or of the sensitized strip.

The body of the camera being closed by a rigid cover 15, I have provided a device for pressing the film flat against this cover without undue pressure and under sufficient tension. With this in view I have devised an inner cage 16 (Figures 1, 2 and 7) so formed as to offer slip-ways 16', 16", while at its ends it carries hollowed rollers or drums 17, the axles or cores of which are solid as shown at 18 and which serve to guide the film. Flat springs 19 secured on the forepart of the cage 16 bear on the front wall 20 of the camera, and, when cover 15 is positioned, they apply the whole cage on the latter whose position has but to be considered, allowance being made for the thickness of the film, to effectuate proper adjustment of the apparatus, such adjustment being readily operated by means of the objective ring, or better still by adjusting the thickness of the camera slide, the objective having been previously brought into contact with the latter so as to improve efficiency.

A tube 21 having a suitably calculated diameter, is soldered to the cage 16 and penetrates through the front wall 20 of the camera into the slide or shutter 22 so as to constitute a baffle in view of ensuring better tightness to light and thereby to remedy the filtering of light through deficient contact of the shutters and of the slide plate.

The appended drawing illustrates on an enlarged scale a camera intended to use ordinary kinema film. The useful portion, vertically limited by perforations, is 24 millimeters wide. On account of borders or margins there are, opposite the perforations, spaces liable to increase encumbrance without any benefit. I found it advantageous therefore to combine various accessory fitments (counter, finder) so as to house them therein.

The counter, actuated by the feed of the perforation opposite slipways 16', 16'', is arranged within one of these slipways at 23 on the side through which loading is effectuated and operated by the drive of the take up reel 8 in order to drive as directly as can be the pinion 24 of the counter.

The finder 25 is located opposite within a recess 26 in the top wall 1' of the camera so as to occasion no bulging nor projection at all on the body thereof.

Having now particularly ascertained and described the nature of my said invention as well as the manner in which the same is to be performed, I declare that what I claim is:

1. A photographic camera for use with cinematograph or other films, having film carrying means comprising a pair of fixed tubes with slots for the passage of the film, a removable tube fitted in each of the fixed tubes and having a similar slot therein, means for preventing movement of the removable tube relative to the fixed tubes, film take-up and pay-out spools in the removable tubes, and film guiding means between the said spools, including a cage device, spring means engaging the cage and the camera body for pressing the cage towards the camera back, and guide rolls for guiding the film through the said slots and between the said cage and the camera back.

2. A photographic camera according to claim 1 in which the means for preventing movement of the removable tubes relative to the fixed tubes comprises bolts extending through the said removable tubes and through the spools therein, extended ends on said bolts and movable catches mounted on the body of the camera and engaging said extended ends.

3. A photographic camera according to claim 1 in which the said cage device comprises longitudinal members for engaging the marginal edges of the film and pressing same against the back wall of the camera, and a cylindrical extension extending forwardly into the shutter-chamber of the camera.

4. A photographic camera according to claim 1 in which each removable tube comprises a cylindrical part frictionally engaging the internal surface of the fixed tube and one closed end, and means on the camera for engaging and locking a peripheral edge of said closed end.

In testimony whereof I affix my signature.

EMILE GUÉRIN.